United States Patent Office  3,810,738
Patented May 14, 1974

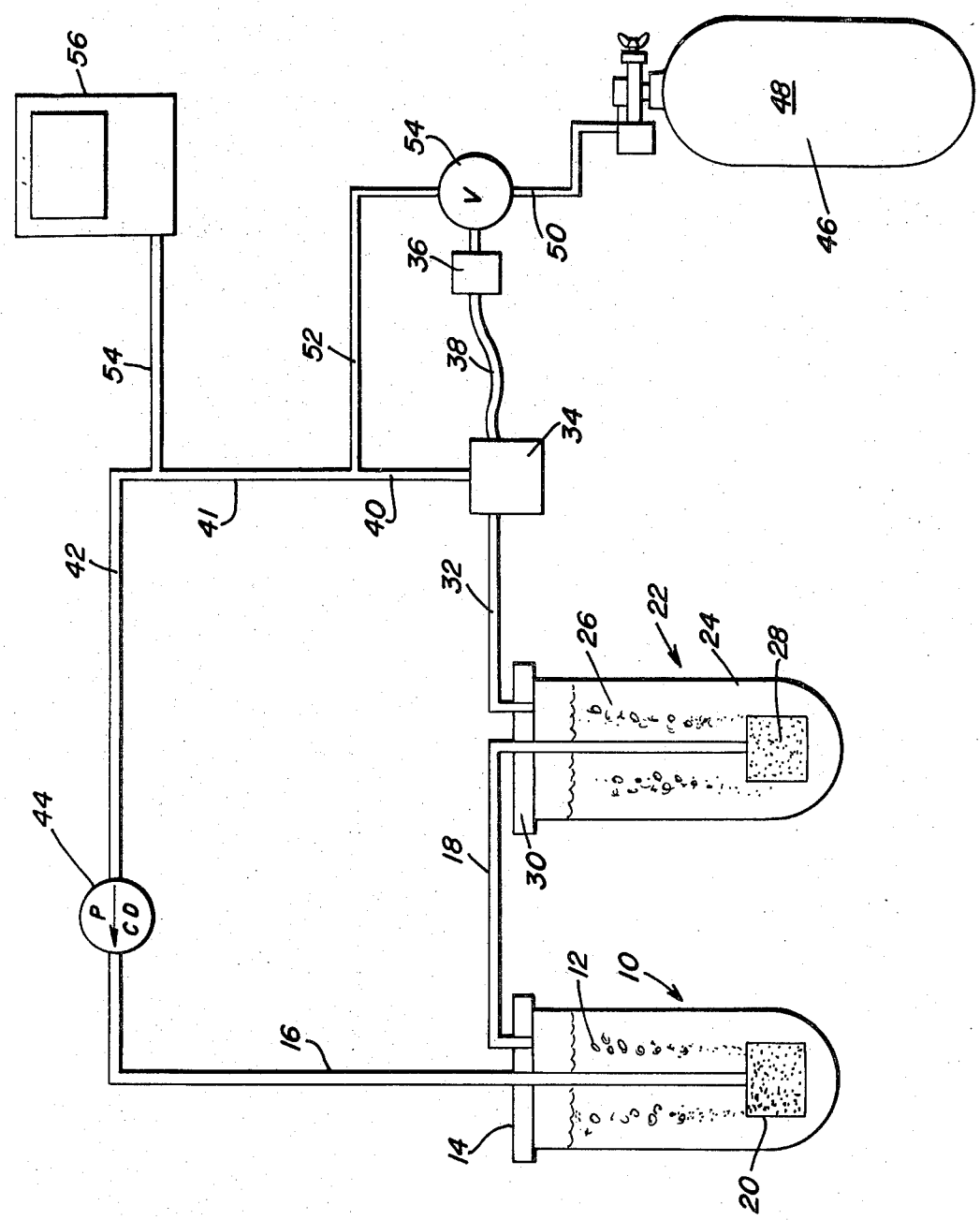

3,810,738
BOD MEASURING APPARATUS
Lewis W. Fleischmann, 8502 Allenwood Road,
Randallstown, Md. 21133
Filed Aug. 14, 1972, Ser. No. 280,086
Int. Cl. G01n 7/00, 7/02
U.S. Cl. 23—230 R                                    15 Claims

ABSTRACT OF THE DISCLOSURE

The BOD of a wastewater sample is measured by continuously recirculating an oxygen-containing gas through a closed loop gas passageway adapted to pass the gas in series through the wastewater sample, a carbon dioxide absorber and an oxygen partial pressure sensor. A make-up gas containing oxygen in a predetermined proportion is admitted to the closed loop passageway in an amount so that the oxygen partial pressure in the circulating gas remains constant. As the system is operated, sufficient makeup gas is admitted to the system to keep the oxygen partial pressure constant. Consequently, the inert gas in the makeup gas admitted along with the oxygen causes the pressure of the system to build as more and more oxygen is consumed. Measurement of the gas pressure in the closed loop gas passageway after a predetermined amount of time therefore indicates the BOD of the sample.

BACKGROUND OF THE INVENTION

The present invention relates to a method and apparatus for measuring the BOD content of a wastewater sample.

As is well known, common wastewater contains naturally occurring micro-organisms which are capable of converting the objectionable organic matter therein when in contact with oxygen to harmless carbon dioxide. Conventional wastewater treating processes take advantage of this phenomenon by intimately contacting wastewater with air until the objectionable organic matter contained therein is substantially completely consumed.

In a typical wastewater treatment plant, a given wastewater charge is continuously contacted with air until its objectionable organic matter concentration is reduced to acceptable levels. In this regard, it is a well accepted practice in the trade to describe the concentration of objectionable organic matter in a given wastewater sample in terms of the amount of oxygen the sample will consume if all the objectionable organic matter is eliminated by the micro-organism. This figure, when expressed in milligrams per liter, is referred to as the biochemical oxygen demand, or BOD, of the sample. Because the amount of oxygen consumed by the sample is directly proportional to the amount of objectionable organic matter in the sample, simple determination of the BOD of the sample indicates the extent of its contamination.

A number of methods have been developed in the prior art for measuring the BOD of a wastewater sample. In the most commonly practiced method, the BOD5, a given volume of the sample is simply filled into a suitable closed vessel containing a carbon dioxide absorber and a predetermined amount of air. After five days the amount of oxygen consumed by the sample is determined, usually by measuring the pressure decrease in the system with a monometer.

Since it is known that about two thirds of the objectionable organic matter in the sample will be consumed in five days, the amount of oxygen consumed in the BOD5 test is multiplied by 1.5 to give the BOD of the sample.

Unfortunately, this method is very time consuming since it takes five days to run a complete test. Moreover this method can also be relatively inaccurate, especially when samples containing high concentrations of objectionable organic matter are processed. Consequently, it is often necessary to dilute many wastewater samples before the actual BOD5 test begins.

Other methods have also been developed for measuring wastewater BOD. However, these methods are either too inaccurate to be practical, too complicated to be practiced by any but skilled personnel, or too complicated to be practiced in inexpensive equipment.

Accordingly, it is an object of this invention to provide a method and apparatus for quickly and accurately determining the BOD of a wastewater sample.

It is another object of this invention to provide a method and apparatus for determining the BOD of a wastewater sample which is simple enough for unskilled personnel to operate.

It is a still further object of this invention to provide apparatus for determining the BOD of a wastewater sample which is of simple construction and hence inexpensive to make.

SUMMARY OF THE INVENTION

These and other objects are accomplished according to the present invention wherein an oxygen-containing gas is continuously recirculated through a constant volume closed loop system adapted to pass the gas in series through the wastewater sample, a carbon dioxide absorber, and an oxygen partial pressure sensor. The oxygen sensor is connected to a control valve adapted to admit a make-up gas containing predetermined portions of oxygen and an inert gas to the closed loop system. The oxygen sensor and the control valve are so set that sufficient make-up gas is passed into the closed loop to keep the oxygen partial pressure constant.

When the BOD of a wastewater sample is to be measured, the oxygen-containing gas in the closed loop system is made to recirculate through its closed loop path. As the gas passes through the wastewater sample, the biochemical reaction occurs thereby converting a portion of the oxygen in the gas to carbon dioxide which is absorbed in the carbon dioxide absorber. The gas then passes into the oxygen sensor, and sufficient oxygen and inert gas are introduced into the closed loop to raise the oxygen partial pressure to its original value. Thereafter, the new gas mixture passes back into the wastewater sample for another pass through the system.

Since the amount of oxygen entering the system through the make-up gas is equal to the amount of oxygen consumed, and because a predetermined amount of inert gas enters the system for each amount of oxygen entering the system, the total pressure of the gas in the closed loop builds in direct proportion to the amount of oxygen consumed. Accordingly, the gas pressure in the closed loop is simply measured after a predetermined amount of time to indicate the BOD of the sample.

Because the partial pressure of oxygen in the closed loop is kept constant, the system more closely approximates conventional wastewater treatment processes using air having oxygen at a constant and high partial pressure. Consequently the accuracy of the inventive system is improved. Moreover, because the indicator of sample BOD is the pressure of the gas in the system, measurement of the BOD can be easily accomplished by simply reading the dial or other indicator of a conventional pressure gauge.

BRIEF DESCRIPTION OF THE DRAWING

The present invention may be more readily understood by reference to the figure which is a schematic illustration of the apparatus employed in the inventive system.

DETAILED DESCRIPTION

Referring to the figure, the inventive apparatus is provided with a container 10 for holding a predetermined amount of a wastewater sample 12. Securely fixed to the top of container 10 is a cap 14, through which passes conduit 16 having an air stone 20 attached thereto adapted to bubble gas in gas conduit 16 into the wastewater sample 12.

Gas conduit 18 which also passes through cap 14, is adapted to receive the gas rising to the top of waste-water sample 12 in container 10. Gas collected in gas conduit 18 passes into a carbon dioxide absorber generally indicated at 22, which as shown, is composed of a container 24 having an aqueous potassium hydroxide solution 26 contained therein. Gas passing into carbon dioxide absorber 22 passes through air stone 28 into the potassium hydroxide solution 26 where carbon dioxide in the gas is absorbed.

The carbon dioxide-free gas rising to the top of potassium hydroxide solution 26 passes through cap 30 of container 24 into gas conduit 32 where it is transported to oxygen sensor 34. The oxygen sensor 34 is adapted to measure the oxygen partial pressure of the gas passing therein and to further convey this information to control box 36 by means of lines 38. Oxygen sensing devices for measuring the oxygen partial pressure of a gas stream are well known in the art, and any conventional oxygen sensor can be used in the inventive system.

Attached to the gas outlet vent of oxygen sensor 34 is a gas conduit 40 which is connected to gas conduit 41, which is in turn connected to gas conduit 42. Attached to the other end of gas conduit 42 is constant delivery pump 44 which is adapted to pump the gas in gas conduit 42 into gas conduit 16. When constant delivery pump 44 is actuated, gas continuously recirculates through the closed loop gas passageway defined by gas conduit 16, container 10, gas conduit 18, container 24, gas conduit 32, oxygen sensor 34, gas conduit 40, gas conduit 41, gas conduit 42 and constant delivery pump 44.

A compressed gas cylinder 46 containing make-up gas 48 under high pressure is provided to introduce make-up gas into gas conduit 41 through gas conduits 50 and 52. The make-up gas employed in the inventive system contains a predetermined portion of oxygen with the remainder being one or more substantially inert gases, that is gases which do not react with the wastewater sample and do not react with or become absorbed by the carbon dioxide absorber. In a preferred embodiment of the invention, compressed air is selected as the make-up gas since it is inexpensive to use. Other gases, such as a mixture of 10% oxygen and 90% nitrogen or helium can be used, however, with equal facility.

As shown in the figure, before make-up gas 48 in cylinder 46 passes into gas conduit 41, it must pass through control valve 54 which is controlled by control box 36. Control box 36 and control valve 54 are so set that the amount of make-up gas 48 allowed to enter the system is just that sufficient to keep the partial pressure of oxygen as measured by oxygen sensor 34, constant throughout the length of the test cycle.

Also attached to gas conduit 41 is gas conduit 54, which is connected at its other end to pressure gauge 56. Gas conduit 54 is provided so that the pressure of the gas in gas conduit 41 can be sensed by pressure gauge 56, and consequently there is no positive displacement of gas through gas conduit 54.

The particular type of pressure gauge employed in the inventive system is not critical, and any conventional pressure gauge can be used. However, it is preferable to employ a pressure gauge capable of continuously recording the instantaneous gas pressure in gas conduit 41 so that a written record, preferably in graph form, can be maintained of the oxygen consumption. As an example of the type of recorder preferably employed in the inventive system, the "Rustrak pressure recorder" has been found to work very effectively in the embodiment of the invention illustrated in the figure.

The operation of the inventive BOD measuring system when air is used as the make-up gas will now be described. With containers 10 and 24 disconnected from the system, the constant delivery pump 44 is actuated so that ambient air passes through oxygen sensor 34. Control box 36 is then set so that control valve 54 will be opened when the oxygen partial pressure is reduced below the partial pressure of oxygen in normal air. The pressure recorder if used is then set to zero and started. Container 24 is filled with a potassium hydroxide solution and attached to cap 31. Container 10 is then filled with a predetermined volume of wastewater sample 12 and attached to cap 14.

Gas pumped out of constant delivery pump 44 passes through gas conduit 16 and air stone 20 into the wastewater sample 12. In the wastewater sample, the microorganisms convert a portion of the oxygen in the gas to carbon dioxide as part of the objectionable organic matter is consumed. The carbon dioxide-rich gas produced thereby passes through cap 14 of container 10, through gas conduit 18, into container 24 and through air stone 28 into potassium hydroxide solution 26 where the carbon dioxide in the gas precipitates in the form of potassium carbonate. The gas collecting at the top of container 25, now purified of its carbon dioxide content, passes by means of gas conduit 32 into oxygen sensor 34.

Because a portion of the oxygen originally contained in the gas in gas conduit 16 was consumed by the wastewater sample, oxygen sensor 34 measures the oxygen gas partial pressure to be less than its initial value. This information is sent from the oxygen sensor by means of lines 38 to control box 36. Because control box 36 is set to ensure that the oxygen partial pressure remains at its initial value, it activates control valve 54 to admit a proper quantity of make-up gas, which in this case is compressed air, through gas conduits 50 and 52 into gas conduit 41. The oxygen-poor gas in gas conduit 40 and the make-up gas in gas conduit 52 are combined in gas conduit 41 and passed by means of gas conduit 42 into constant delivery pump 44 for another pass through the system.

As indicated above, the control box 36 and control valve 54 are so set that the oxygen partial pressure in the system remains constant. Thus, as a given amount of oxygen is consumed by the wastewater sample, an equal amount of oxygen is passed into the system in make-up gas 48. However, because make-up gas 48 contains an inert gas as well as oxygen, a fixed and known amount of inert gas is admitted to the system for each amount of oxygen admitted. For example, when air is used as the make-up gas as described above, four parts of nitrogen (and other inert gases) are introduced into the system for each part of oxygen introduced. And because these four parts of nitrogen are not consumed by the wastewater sample, they remain in the closed loop system throughout the entire length of the test. Consequently, as more and more oxygen is consumed by the wastewater sample, the pressure in the closed loop system builds and builds. And since the amount of nitrogen added is always four times the amount of oxygen consumed, the pressure builds in direct proportion to the amount of oxygen consumed. The pressure recorder 56, which has been recording the pressure of the gas during the operation of the system, therefore directly indicates the amount of oxygen consumed by the wastewater sample. The determination of the amount of oxygen consumed over a predetermined amount of time, for example five days, indicates the BOD of the sample in the same manner that BOD is indicated in the traditional BOD5 test described above.

It has been found that the inventive BOD measuring system is capable of providing very accurate measurement of wastewater sample BOD even when the concentration of objectionable organic matter in the sample is very high. While not wishing to be bound to any theory, it is believed that this advantageous result is due to the fact that the wastewater sample in the inventive system is always subjected to a constant and high oxygen partial pressure. This, of course, more closely approximates the actual conditions occurring in conventional wastewater treatment processes, and is thus more accurate than BOD measuring systems in which no additional oxygen is added as some is consumed or in which additional oxygen is added discontinuously.

Still another advantage of the inventive system is that the amount of oxygen consumed by the wastewater sample is indicated in terms of a gas pressure, which is a comparatively easy value to measure and record. This is far superior to many prior art systems in which the actual oxygen content of the effluent treating gas must be measured or in which complicated systems are employed to record the amount of additional oxygen fed to a wastewater sample.

Finally, still another advantage of the inventive system, at least when equipped with a Rustrak recorder or other similar recording device, is that the BOD of most samples can be determined in several hours or less. In this regard it is well known in the art that the same kind of wastewater sample always consumes oxygen in the same manner. Consequently, graphs showing the consumption of oxygen as a function of time for a great number of different wastewater samples are already available in the art. These graphs can be used as standards for judging the BOD of a sample processed by the inventive system, since when equipped with a Rustrak recorder or other similar recording device, the inventive system directly produces a graph of exactly the same type as the already available standards. And because the inventive system is so accurate, the initial portion of the curve produced after only several hours of operation is sufficient when compared with already completed graphs to accurately indicate the BOD of the sample.

While only one particular embodiment of the inventive system has been described above, it should be understood that many modifications can be made without departing from the spirit and scope of the invention. In this regard, it should be appreciated that the pressure gain exhibited by the inventive system as oxygen is consumed is a direct function of the concentration of oxygen in make-up gas 48. Accordingly, the composition of make-up gas 48 can be varied at will to change the pressure gain of the system as desired. For example, a gas consisting of 1% oxygen and 99% nitrogen can be very advantageously used as the make-up gas. When such a gas is employed, the inventive system operates in exactly the same way as described above except that the pressure gain is 99 to 1 instead of 4 to 1 as in the case with air, since 99 parts nitrogen are introduced for each part of oxygen consumed.

Also, while the foregoing description has indicated that the carbon dioxide absorber is a solution of potassium hydroxide, it should be understood that any composition or device capable of removing carbon dioxide from a gas mixture can be employed. For example, it is within the scope of the present invention to employ aqueous solutions of barium hydroxide or sodium hydroxide in place of the potassium hydroxide solution illustrated above. Moreover, solid carbon dioxide absorbants, such as the commercially available "Baralyme" or "Sodasorb" can also be employed.

It should also be appreciated that the inventive BOD measuring apparatus can be run with the partial pressure of oxygen in the closed loop gas passageway higher than the partial pressure of oxygen in air even when compressed air is used as the make-up gas. This can be accomplished by simply allowing control valve 54 to initially admit sufficient air to the closed loop gas passageway to bring the oxygen partial pressure in the gas passageway to the desired high value. Thereafter, control box 36 is set so that the oxygen partial pressure remains at this high value. In a similar manner, the oxygen partial pressure in the closed loop gas passageway can be maintained above the oxygen partial pressure of any other make-up gas when at atmospheric pressure simply by initially admitting sufficient make-up gas to bring the oxygen partial pressure to the desired value and thereafter setting control box 36 to maintain the oxygen partial pressure at this value.

Operating the inventive apparatus in this manner, at least when air is the make-up gas, subjects the wastewater sample to an environment more closely approximating the conditions occurring in a few recently promulgated wastewater treatment processes in which the oxygen partial pressure of the treating gas is higher than normal. Accordingly, when treatment of wastewater by means of one of these newly promulgated processes is contemplated, measurement of sample BOD with an apparatus more nearly approximating the conditions encountered in these new processes is preferred.

The foregoing description has been presented for illustrative purposes only and is not intended to limit the present invention in any way. All reasonable modifications not specifically set forth are intended to be included in the scope of the present invention, which is to be limited only by the following claims.

What is claimed is:

1. Apparatus for determining the BOD of a wastewater sample comprising:
   a constant volume closed loop gas passageway;
   means to continuously recirculate gas through said gas passageway;
   container means in said gas passageway for holding a quantity of wastewater, said container means adapted to pass gas in said gas passageway through the wastewater therein;
   cleaning means in said gas passageway for removing carbon dioxide from said gas passageway;
   supply means responsive to the oxygen partial pressure in said gas passageway for supplying an amount of oxygen containing make-up gas into said gas passageway; and
   pressure measuring means to measure the pressure of the gas in said gas passageway.

2. Apparatus according to claim 1 wherein said supply means is adapted to supply sufficient make-up gas into said gas passageway to keep the oxygen partial pressure in said gas passageway constant.

3. Apparatus according to claim 1 wherein said pressure measuring means is adapted to measure and record the pressure of the gas in said gas passageway as a function of time.

4. Apparatus according to claim 1 wherein said cleaning means comprises a container containing a carbon dioxide-retaining composition selected from the group consisting of an aqueous solution of potassium hydroxide, an aqueous solution of barium hydroxide, an aqueous solution of sodium hydroxide and a solid carbon dioxide absorbent, said absorbing means further characterized in that gas passed therein is adapted to be intimately contacted with said carbon dioxide-retaining composition.

5. Apparatus according to claim 1 further comprising means to distribute gas passed into said wastewater so that gas passes through the wastewater in minute bubbles.

6. Apparatus according to claim 1 wherein said supply means includes: a supply tank for holding a quantity of make-up gas; a supply conduit attached to said supply tank for transporting make-up gas from said supply tank to said gas passageway; a control valve attached to said supply conduit for controlling the amount of gas flowing therethrough; sensing means for sensing the oxygen partial pressure in said gas conduit; and control means for controlling said control valve in response to said sensing means.

7. Apparatus according to claim 6 wherein said control means and said control valve are adapted to maintain the oxygen partial pressure in said gas passageway constant.

8. Apparatus according to claim 6 wherein said cleaning means comprises a container containing a carbon dioxide-retaining composition selected from the group consisting of an aqueous solution of potassium hydroxide, an aqueous solution of barium hydroxide, an aqueous solution of sodium hydroxide and a solid carbon dioxide absorbent, said absorbing means further characterized in that gas passed therein is adapted to be intimately contacted with said carbon dioxide-retaining composition.

9. A process for measuring the BOD of wastewater sample comprising establishing a constant volume closed loop gas passageway, continuously recirculating an oxygen-containing gas around said closed loop gas passageway, passing the gas as it recirculates around said gas passageway into a predetermined volume of the wastewater sample to be analyzed, removing carbon dioxide from the gas as it recirculates around its closed loop passageway, adding an additional amount of make-up gas to the gas recirculating around its closed loop gas passageway, said make-up gas containing a predetermined proportion of oxygen, and measuring the pressure of the gas flowing in said closed loop gas passageway, said process further characterized in that the amount of make-up gas added to the gas flowing in said gas passageway is sufficient to maintain the oxygen partial pressure constant.

10. A process according to claim 9 wherein said make-up gas is air.

11. A process according to claim 9 wherein the amount of make-up gas added to the system is sufficient to keep the oxygen partial pressure at its initial value.

12. A process according to claim 11 wherein the initial value of the oxygen partial pressure is the same as the partial pressure of oxygen in air.

13. A process according to claim 11 wherein the initial value of the oxygen partial pressure is higher than the partial pressure of oxygen in air.

14. A process according to claim 9 wherein the pressure of the gas in said closed loop gas passageway is recorded as a function of time.

15. A process according to claim 9 wherein the gas continuously recirculated in said closed loop gas passageway is first bubbled through the wastewater sample so that a carbon dioxide-rich gas is produced, the carbon dioxide-rich gas is thereafter intimately contacted with a carbon dioxide retaining composition so that carbon dioxide is removed from the make-up gas and thereafter the partial pressure of oxygen in the gas is measured.

References Cited

UNITED STATES PATENTS

| 3,296,435 | 1/1967 | Teal et al. | 23—230 PC |
| 3,560,156 | 2/1971 | Teal et al. | 23—230 PC |
| 3,579,305 | 5/1971 | Neti | 23—232 R |
| 3,647,392 | 3/1972 | McGinnis | 23—232 E |

MORRIS O. WOLK, Primary Examiner

R. E. SERWIN, Assistant Examiner

U.S. Cl. X.R.

23—232 R, 253 R, 254 R